(12) United States Patent
Aguirrebeitia et al.

(10) Patent No.: US 11,670,163 B2
(45) Date of Patent: Jun. 6, 2023

(54) METHOD OF PREDICTING A TRAFFIC BEHAVIOUR IN A ROAD SYSTEM

(71) Applicant: Kapsch TrafficCom AG, Vienna (AT)

(72) Inventors: Carlos Gil Aguirrebeitia, Bilbao (ES); Rubén García Casado, Bilbao (ES)

(73) Assignee: KAPSCH TRAFFICCOM AG, Vienna (AT)

( * ) Notice: Subject to any disclaimer, the term of this patent is extended or adjusted under 35 U.S.C. 154(b) by 292 days.

(21) Appl. No.: 16/476,837

(22) PCT Filed: Jan. 23, 2018

(86) PCT No.: PCT/EP2018/051549
§ 371 (c)(1),
(2) Date: Jul. 9, 2019

(87) PCT Pub. No.: WO2018/141582
PCT Pub. Date: Aug. 9, 2018

(65) Prior Publication Data
US 2019/0378406 A1 Dec. 12, 2019

(30) Foreign Application Priority Data
Feb. 1, 2017 (EP) ..................................... 17154100

(51) Int. Cl.
*G08G 1/01* (2006.01)
(52) U.S. Cl.
CPC ......... *G08G 1/0129* (2013.01); *G08G 1/0116* (2013.01); *G08G 1/0133* (2013.01)
(58) Field of Classification Search
CPC .. G08G 1/0129; G08G 1/0116; G08G 1/0133; G08G 1/01; G08G 1/125;
(Continued)

(56) References Cited

U.S. PATENT DOCUMENTS 3,663,937 A * 5/1972 Bolner ..................... G08G 1/04
340/937
6,178,374 B1 * 1/2001 Mohlenkamp ... G08G 1/096716
340/905

(Continued)

FOREIGN PATENT DOCUMENTS

CN      106251625 A    12/2016
EP        2336722 A1    6/2011
(Continued)

OTHER PUBLICATIONS

Wendy Weijermars—Analyzing Traffic Patterns; Proceedings of the 8th International IEEE Conference on Intelligent Transportation Systems; Vienna, Austria, Sep. 13-16, 2005 (Year: 2005).*

(Continued)

*Primary Examiner* — Aniss Chad
*Assistant Examiner* — Christopher George Fees
(74) *Attorney, Agent, or Firm* — Weaver IP L.L.C.

(57) ABSTRACT

The present subject matter relates to a method of predicting a traffic behaviour in a road system, comprising the following steps carried out by at least one processor connected to a database, which contains a set of traffic profiles: clustering the traffic profiles; calculating a significance value; if the significance value of a tag is higher than a threshold value, assigning this tag as a characteristic vector to this cluster; receiving a request having one or more request tags; determining a cluster by means of matching the request tag/s to the characteristic vectors of the clusters; and outputting a predicted traffic behaviour based on the determined cluster.

20 Claims, 6 Drawing Sheets

(58) Field of Classification Search
CPC ...... G08G 1/065; G08G 1/0962; G01C 21/24; G01C 21/32; G06N 20/00; G09B 29/00
See application file for complete search history.

(56) References Cited

U.S. PATENT DOCUMENTS

| | | | | |
|---|---|---|---|---|
| 8,417,442 | B2* | 4/2013 | Johnson | G08G 1/0112 701/118 |
| 9,390,622 | B2* | 7/2016 | Kamarianakis | G08G 1/0129 |
| 9,518,837 | B2* | 12/2016 | Fowe | G08G 1/0104 |
| 9,564,048 | B2* | 2/2017 | Liu | G08G 1/0129 |
| 10,215,579 | B2* | 2/2019 | Jung | G01C 21/3492 |
| 2002/0082767 | A1* | 6/2002 | Mintz | G08G 1/0133 701/117 |
| 2004/0249559 | A1* | 12/2004 | Mintz | G01C 21/3492 701/117 |
| 2005/0021225 | A1* | 1/2005 | Kantarjiev | G01C 21/3691 701/527 |
| 2007/0208495 | A1* | 9/2007 | Chapman | G08G 1/0112 701/117 |
| 2007/0208496 | A1* | 9/2007 | Downs | G08G 1/0112 701/117 |
| 2008/0071465 | A1* | 3/2008 | Chapman | G08G 1/0104 701/117 |
| 2010/0073196 | A1* | 3/2010 | Bogenberger | G08G 1/0112 340/934 |
| 2012/0109506 | A1* | 5/2012 | Fei | G08G 1/0133 701/118 |
| 2013/0013178 | A1* | 1/2013 | Brant | G08G 1/083 701/117 |
| 2013/0151135 | A1* | 6/2013 | Aubrey | G08G 1/0116 701/118 |
| 2013/0297387 | A1* | 11/2013 | Michael | G06Q 30/02 705/13 |
| 2013/0304333 | A1* | 11/2013 | Fuehrer | G08G 1/0112 701/51 |
| 2013/0328698 | A1* | 12/2013 | Ramachandran | G08G 1/0141 340/905 |
| 2014/0005916 | A1* | 1/2014 | Shen | G08G 1/0129 701/119 |
| 2014/0032091 | A1* | 1/2014 | Arcot | G08G 1/0129 701/119 |
| 2014/0039782 | A1* | 2/2014 | Gupta | G08G 1/0116 701/119 |
| 2014/0222321 | A1* | 8/2014 | Petty | G01C 21/3492 701/117 |
| 2014/0278031 | A1* | 9/2014 | Scofield | G08G 1/096888 701/118 |
| 2014/0335897 | A1* | 11/2014 | Clem | G08G 1/147 455/456.3 |
| 2015/0006069 | A1* | 1/2015 | Kwon | G08G 1/0141 701/119 |
| 2015/0032366 | A1* | 1/2015 | Man | H04W 4/024 701/414 |
| 2015/0042463 | A1* | 2/2015 | Hiramatsu | G07C 5/085 340/439 |
| 2015/0057914 | A1* | 2/2015 | Hiramatsu | G08G 1/0112 701/117 |
| 2015/0127245 | A1* | 5/2015 | Jang | G08G 1/0129 701/117 |
| 2015/0166072 | A1* | 6/2015 | Powers | G08G 1/0129 701/1 |
| 2015/0206428 | A1* | 7/2015 | Kurzhanskiy | G08G 1/0129 701/119 |
| 2015/0228188 | A1* | 8/2015 | Macfarlane | G08G 1/0129 340/936 |
| 2015/0325119 | A1* | 11/2015 | Lehnertz | G08G 1/0116 701/118 |
| 2016/0025510 | A1* | 1/2016 | Belzner | G08G 1/0112 701/533 |
| 2016/0133130 | A1* | 5/2016 | Grimm | H04W 4/80 340/905 |
| 2016/0225258 | A1* | 8/2016 | Aparicio Ojea | G08G 1/097 |
| 2016/0247397 | A1* | 8/2016 | Xu | G08G 1/0141 |
| 2016/0275404 | A1* | 9/2016 | Abraham | G06Q 10/20 |
| 2016/0284212 | A1* | 9/2016 | Tatourian | G08G 1/096725 |
| 2017/0011625 | A1* | 1/2017 | Stelzig | G08G 1/0133 |
| 2017/0084172 | A1* | 3/2017 | Rolle | G08G 1/04 |
| 2017/0161614 | A1* | 6/2017 | Mehta | G06N 20/00 |
| 2017/0243121 | A1* | 8/2017 | Lai | G08G 1/0129 |
| 2017/0262790 | A1* | 9/2017 | Khasis | G08G 1/012 |
| 2018/0012486 | A1* | 1/2018 | Israelsson | G01C 21/32 |
| 2018/0063002 | A1* | 3/2018 | Filley | G08G 1/012 |
| 2018/0089995 | A1* | 3/2018 | Zhang | G08G 1/0133 |
| 2018/0124319 | A1* | 5/2018 | Jo | G06T 7/285 |
| 2018/0157975 | A1* | 6/2018 | Hahn | G08G 1/0129 |
| 2018/0240336 | A1* | 8/2018 | Kareev | G06K 9/00771 |
| 2018/0299284 | A1* | 10/2018 | Wang | G01C 21/3694 |
| 2018/0322776 | A1* | 11/2018 | Bararsani | G08G 1/0129 |
| 2018/0342156 | A1* | 11/2018 | Martin | G08G 1/0145 |
| 2019/0180612 | A1* | 6/2019 | Demiryurek | G01C 21/20 |
| 2019/0283745 | A1* | 9/2019 | Nagel | B60W 30/0956 |
| 2019/0311615 | A1* | 10/2019 | Ashida | G08G 1/0112 |

FOREIGN PATENT DOCUMENTS

| | | | |
|---|---|---|---|
| JP | 2006079483 A | * | 3/2006 |
| WO | 2011/060730 A1 | | 5/2011 |
| WO | 2018/141582 A1 | | 8/2018 |

OTHER PUBLICATIONS

Hastie et al.—The Elements of Statistical Learning: Data Mining, Inference, and Prediction (Year: 2008).*
Extended European Search Report received for European Patent Application No. 17154100.6, dated Jul. 18, 2017, 8 pages.
International Preliminary Report on Patentability received for PCT Application No. PCT/EP2018/051549, dated May 15, 2019, 19 pages.
International Search Report and Written Opinion received for PCT Application No. PCT/EP2018/051549, dated Apr. 24, 2018, 13 pages.
Weijermars, et al., "Analyzing Highway Flow Patterns Using Cluster Analysis", Proceedings of the 8th International IEEE Conference on Intelligent Transportation Systems, Vienna, Austria, Sep. 13-16, 2005, pp. 831-836.
Yanbin, et al., "Eady Warning of Traffic Accident in Shanghai Based on Large Data set Mining", International Conference on Intelligent Transportation, Big Data & Smart City, Shanghai Maritime University, College of Transport & Communications, Shanghai, 2016, pp. 18-21.

* cited by examiner

METHOD OF PREDICTING A TRAFFIC BEHAVIOUR IN A ROAD SYSTEM

CROSS-REFERENCE TO RELATED APPLICATION(S)

This application is a U.S. national phase application of PCT/EP2018/051549, filed on Jan. 23, 2018, which claims priority to European Patent Application No. 17/154,100.6, filed on Feb. 1, 2017, which are both incorporated by reference herein in their entireties.

BACKGROUND

Technical Field

The present subject matter relates to a method of predicting a traffic behaviour in a road system on the basis of a set of traffic profiles, each of which represents a traffic measure of vehicles in the road system recorded over time, wherein one or more pre-defined tags associated with a time of recording of the specific traffic profile is/are attributed to said traffic profile.

The present subject matter thus concerns the field of measuring and evaluating vehicle traffic behaviour, for example traffic behaviour on a main street of a city. Once the traffic behaviour on this street has been analyzed over an extended period of time, typically over a year or longer, the aim is to estimate the traffic behaviour for a certain day or time-window in the future. This can be used to predict which road will be congested or blocked at a certain time, e.g., for freighters planning the transportation of cargo or families planning their vacation. Depending on the predicted traffic behaviour, different routes or times at which to travel on this street can then be chosen, whereby in any case the start-to-end journey time for a vehicle can be reduced.

Background Art

To this end, known methods of traffic prediction use a similarity clustering of the recorded profiles and an assigning of characteristic vectors ("labels") of tags to the clusters, which tags can be queried to identify a cluster of traffic profiles as a predicted traffic behaviour for a certain day, e.g., a specific weekday, a "rainy" day, etc.

Weijermars, van Berkom: "Analyzing highway flow patterns using cluster analysis", IEEE Conference on Intelligence Transportation Systems, Sep. 13-16, 2005, shows a method for analyzing traffic patterns. Herein, 118 traffic profiles have been recorded for a highway, each over a time-span of 24 hours. Thereafter, the traffic profiles have been clustered by means of a standard clustering algorithm. After manually labelling the clusters, deviations within the clusters were evaluated.

Instead of manually labelling the clusters, in the state of the art it is also known to find a matching label for cluster by means of a randomised algorithm. Such an algorithm takes up a lot of computational resources and has the problem that certain labels, which could accurately describe the contents of the cluster, cannot be found, because of few corresponding traffic profiles within this cluster.

BRIEF SUMMARY

The present subject matter sets its aim to create a more reliable and quicker method for determining labels of clusters, which can then be used to find a predicted traffic behaviour for a specific request.

To this end, the present subject matter provides for a method of predicting a traffic behaviour in a road system, comprising the following steps carried out by at least one processor connected to a database, which contains a set of traffic profiles, each traffic profile representing a traffic flow or a different traffic measure of vehicles in the road system recorded over time, one or more pre-defined tags associated with a time of recording of the respective traffic profile being attributed to said traffic profile:

clustering the traffic profiles with their tags into at least one cluster as to similarity of traffic profiles;

for at least one tag in each cluster, calculating a significance value by means of a statistical analysis, wherein the significance value of each tag or tag combination, respectively, is calculated by means of a Chi-squared statistic;

if the significance value of a tag is higher than a threshold value, assigning this tag as a characteristic vector to this cluster;

in a prediction engine, receiving a request having one or more request tags to determine a matching cluster;

determining a cluster by means of matching the request tag/s to the characteristic vectors of the clusters; and outputting a predicted traffic behaviour based on the determined cluster.

The plurality of all characteristic vectors of a single cluster is hereinafter referred to as the "label" of this cluster. With the inventive method, labels of clusters can be determined in an efficient and systematic manner. By evaluating a significance value for a tag of a traffic profile within a cluster, it can be checked whether this tag is in fact a valid representation of this cluster. This partial statistical analysis of the cluster can be used to determine "first-level" characteristic vectors that only comprise one tag.

In an exemplary embodiment, there are at least two variables, and each tag is assigned to a variable, the method comprising the further steps of for at least one variable in each cluster, calculating a significance value; and for a tag assigned to the variable with the highest significance value of each cluster, calculating the significance value.

This has the advantage that a "pre-sorting" takes place, which makes the algorithm faster overall. The significance value for the variables can be determined in the same way as for the tags.

In this exemplary embodiment, it is further advantageous if the method comprises the further steps of grouping all traffic profiles that do not contain a tag whose significance value lies above said threshold value to a sub-cluster;

for at least one variable in the sub-cluster, calculating a significance value; and for at least one tag assigned to the variable with the highest significance value of the sub-cluster, calculating the significance value.

The sub-cluster is thus used to "re-use" the traffic patterns that did not comprise tags with a significance level above the threshold level in the first iteration.

Further, in this exemplary embodiment the steps of grouping, calculating the significance value for a variable and calculating the significance value for a tag may be repeated until no more traffic profiles are available for grouping. Here, sub-cluster after sub-cluster is created and evaluated for each variable to obtain all significant tags of the cluster. Furthermore, all of the above-mentioned steps can be repeated for each variable occurring in a cluster to yield the broadest set of significant tags.

Also "second-level" characteristic vectors of a cluster can be determined. A second-level characteristic vector is a combination of two tags, which are together representative of the cluster. Therefore, in an embodiment of the inventive method, for at least one tag whose significance value lies below said threshold, a significance value of a combination of said tag with a further tag is calculated and, if said significance value of said tag combination lies above the threshold, said tag combination is assigned as a further characteristic vector to the cluster of said tag.

Thereby, a level-by-level analysis of the representative characteristic vectors of a cluster can be made. For example, a cluster could contain traffic profiles which were recorded on Fridays in July. While neither "Friday" nor "July" is a representative characteristic vector of this cluster, the tag combination "Friday in July" accurately describes the contents of this cluster and is a characteristic vector for this cluster.

A significance value of a tag combination may be calculated for a tag that had the highest significance value during the "first-level" evaluation, while its significance value was still below a threshold value but may be above a further "lower boundary" threshold level. For this tag, the significance value is determined in combination with all remaining tags or just in combination with the most common of these remaining tags. A tag which has been used as a characteristic vector in the "first-level" evaluation is not considered to be a remaining tag.

Further, also "third-level", "fourth-level", et cet., evaluations may be performed as long as the significance value of a tag combination still lies above said further lower boundary threshold level. The threshold levels can change depending on the number of tags combined.

In an embodiment, for each cluster, significance values for all tags of this cluster are calculated. Thereby, it is not possible to miss out on characteristic vectors whose underlying tags are not very common in this cluster but still describe contents of this cluster accurately. For example, if the tag "Christmas" is the only tag within a cluster, the characteristic value "Christmas" is still significant for this cluster when the tag "Christmas" is a unique tag amongst the entire set of traffic profiles. Alternatively, only the most common or only arbitrary tags are evaluated. The cluster can thus be assigned a label which is derived in a fast, systematic, and reliable manner.

In a further embodiment, when two clusters would be assigned the same characteristic vector, the threshold value is lowered and it is again checked if the significance value of each tag (or tag combination) is higher than the threshold value to assign this tag (or tag combination) as a characteristic vector to this cluster. By means of this, it is possible that an additional tag is added to the characteristic vector that caused the "double labelling" for two different clusters.

Alternatively, the characteristic vector whose tag or tag combination, respectively, has the lower significance value is disregarded. This measure prevents collision problems when determining a cluster by means of matching the tags of the request. In other words, the characteristic vector is discarded for a cluster when a different cluster has the same characteristic vector with a higher significance value.

The significance value of each tag or tag combination can be determined by a variety of statistical analyses. In a first embodiment, the significance value of each tag or tag combination, respectively, is calculated by means of a Chi-squared statistic. The Chi-squared statistic is useful in this method since it gives a highly accurate representation of the significance of a tag or tag combination within a cluster while at the same time considering tags or tag combinations of other clusters. Pearson's Chi-squared statistic may be used.

It has been noticed that certain characteristic vectors always appear in same clusters. For example, Mondays, Tuesdays, Wednesdays, and Thursdays might exhibit the same traffic behaviour, and characteristic vectors with tags relating to these weekdays can be thus be grouped together. By means of this, the determination of a cluster by means of matching the tags of the request can be sped up because the amount of characteristic vectors for this cluster has been reduced, e.g., in this case from four weekdays to one group of days.

In some embodiments, the significance values of the tags or tag combinations are also used when checking whether a request tag matches a characteristic vector. The determined significance value can thus be used twice in the method, firstly when labelling the clusters and secondly when determining the matching cluster. This is advantageous because characteristic vectors with higher significance values are more likely to match a tag of the request than characteristic vectors with lower significance values.

In all embodiments, each traffic profile may represent the traffic measure of vehicles in the road system over a time-span of 24 hours. Alternatively, times-spans of 6 hours, 12 hours or 18 hours can be used, too, especially when the traffic behaviour in certain hours of the day, e.g., night hours or rush hours, are substantially the same for all traffic profiles.

At least one tag may indicate a day of the week, a month of the year, a week of the month, a school vacation indication, or a special holiday indication of said time of recording. Such tags can, e.g., be automatically generated by associating an attribute of a calendar to a traffic profile. The calendar can be defined in advance, in real-time, or in retrospect, and it is also possible to subsequently add tags to traffic profiles when they first occur in a request.

Alternatively or additionally thereto, at least one tag indicates a road condition or a weather condition at said time of recording. Such tags represent a physical measurement of environmental data, which can be coded by the tag in advance, in real-time, or in retrospect.

BRIEF DESCRIPTION OF THE DRAWINGS/FIGURES

The present subject matter shall now be explained in more detail below on the basis of exemplary embodiments thereof with reference to the accompanying drawings, in which.

DETAILED DESCRIPTION

Figure 1:
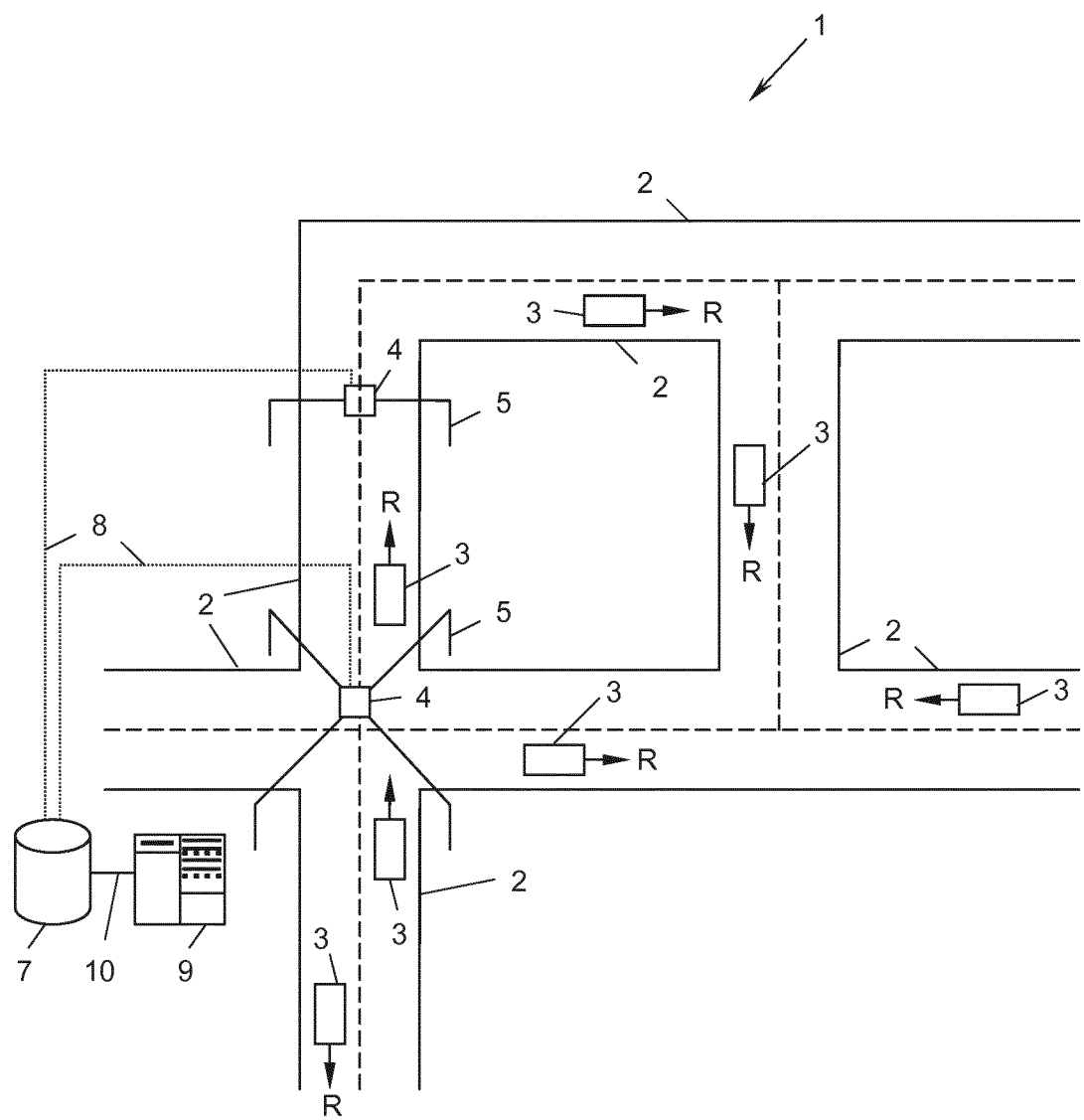
FIG. 1 shows a schematic view of a road system.

In FIG. 1 a road system 1 with a plurality of roads 2 is depicted on which vehicles 3 travel in directions R. The road system 1 is equipped with at least one traffic measuring device 4, which can be, for example, used for measuring traffic flow on a road 2 or on an intersection of roads 2. The traffic measuring device 4 may be mounted on a gantry 5 spanning the road 2 or may alternatively be mounted roadside. The traffic measuring device 4 can be embodied as any type known in the state of the art, e.g., as inductive loops, radar devices, light barriers, video processing cameras, or as wireless readers that read a radio response of so-called onboard-units (OBUs) carried by the vehicles 3.

The traffic measuring device 4 can record the traffic flow on the road 2 directly, e.g., as a number v of vehicles 3 per time unit t, or it can record the number v/t of vehicles 3 travelling on a given section of the road 2 at a given instant in time, e.g., by counting the vehicles 3 in camera pictures of said road section taken at regular time intervals.

Instead of measuring the traffic flow, other traffic conditions on the road can be measured by means of different measurement values too, for example by recording an average speed on the road 2 at a certain point in time t or by measuring the travel time vehicles take to travel a section of the road 2.

Figure 2:
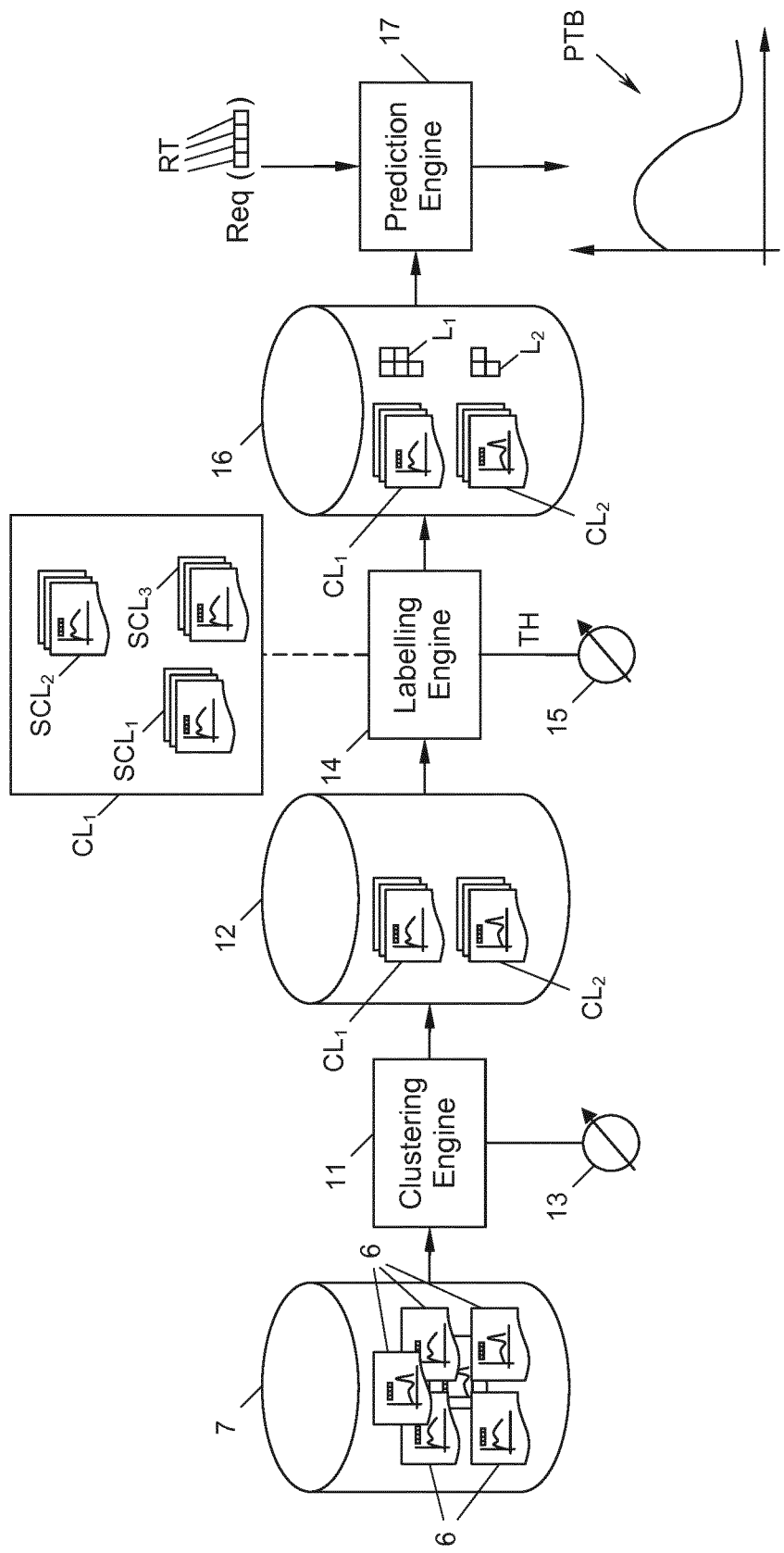
FIG. 2 shows a block diagram of databases and processing engines for performing the method of the present subject matter.

The traffic measuring device 4 records the traffic flow v/t—or equivalent measurement values as described above—per time t over a predefined time-span of, e.g., 24 hours as a traffic profile 6 (FIG. 2). Alternatively, shorter time-spans could be used, too, for example only the most interesting time-spans of, e.g., 6, 12 or 18 hours of a day.

The traffic measuring device 4 records said traffic profiles 6 over an extended period of time, e.g., day after day for a whole year or longer. A traffic profile can be made up of discrete samples, e.g., one sample each 5 min, 15 min, or each hour, or can be an at least partially smooth curve over time. In this way, each traffic measuring device 4 records a set of traffic profiles 6 for its road 2 or intersection of roads 2 and stores it in a database 7 via a data connection 8. A processor 9 is connected to the database 7 via a connection 10 for further processing of the traffic profiles 6, as will be described in the following.

FIG. 2 shows a clustering engine 11, which can be part of the aforementioned processor 9. The clustering engine 11 obtains traffic profiles 6 from the database 7 and clusters these traffic profiles 6 into at least one or at least two clusters $CL_1$, $CL_2$ . . . , generally $CL_i$. The clustering algorithm used in the clustering engine 11 can be of any type known in the state of the art, for example a hierarchical agglomerative clustering algorithm. To this end, the traffic profiles 6 might need to be pre-processed such that they contain, e.g., 96 time samples each at 15 minute intervals. Furthermore, filters can be employed to deal with local anomalies occurring in the traffic profiles 6.

As a result, the clustering engine 11 outputs clusters $CL_i$, each comprising multiple traffic profiles 6 that are similar to each other, to a database 12. This database 12 can be the same as the database 7 or a subset thereof. Furthermore, the clustering engine 11 can be controlled by means of a control setting input 13 to adjust clustering parameters.

After the traffic profiles 6 have been clustered to clusters $CL_i$, a labelling engine 14 is employed to assign a label $L_1$, $L_2$, . . . , generally $L_i$, to each cluster $CL_i$, wherein each label $L_i$, consists of at least one characteristic vector $CV_1$, $CV_2$, . . . , generally $CV_j$. The labels $L_i$ should reflect the contents of the clusters $CL_i$ as accurately as possible.

The method steps performed by the labelling engine 14 will now be described in detail by means of FIG. 3, which shows four exemplary clusters $CL_1$, $CL_2$, $CL_3$, $CL_4$ output by the clustering engine 11. The first cluster $CL_1$, comprises N=100 similar traffic profiles 6, of which only four are shown in diagram 15 for ease of representation. Diagram 15 maps the time t on the horizontal axis and the traffic flow in vehicles per time v/t on the vertical axis. It can further be seen that each of the four exemplary traffic profiles 6 can have one or more, in the present example two to four, pre-defined tags T attributed thereto.

The tags T attributed to a traffic profile 6 are associated in some way with the time of recording said traffic profile 6. For example, a tag T can indicate a day of the week, a month of the year, a week of the month, a school vacation indication, a special holiday indication, a road condition, or a weather condition at the time-span over which its traffic profile 6 had been recorded.

The tags T can be attributed to the traffic profile 6 directly at the time of recording by means of the traffic measuring device 4, at the database 7, or even after clustering at the database 12. To this end, the corresponding devices 4, 7, 12 can each comprise a clock, calendar, weather station, or any means to receive environmental or road condition data. Alternatively, tags T can be attributed to the traffic profiles 6 in retrospect, for example by means of calendars of the databases 7, 12. Calendar, weather, environmental, or road condition information can be attributed in retrospect, for example if a week or a month later information arises that the road on which the traffic flow has been recorded was damaged or under construction. Tags T can even be attributed to the traffic profiles 6 during the step of labelling by means of the labelling engine 14, which can have its own calendar or data inputs for this purpose.

Figure 3:
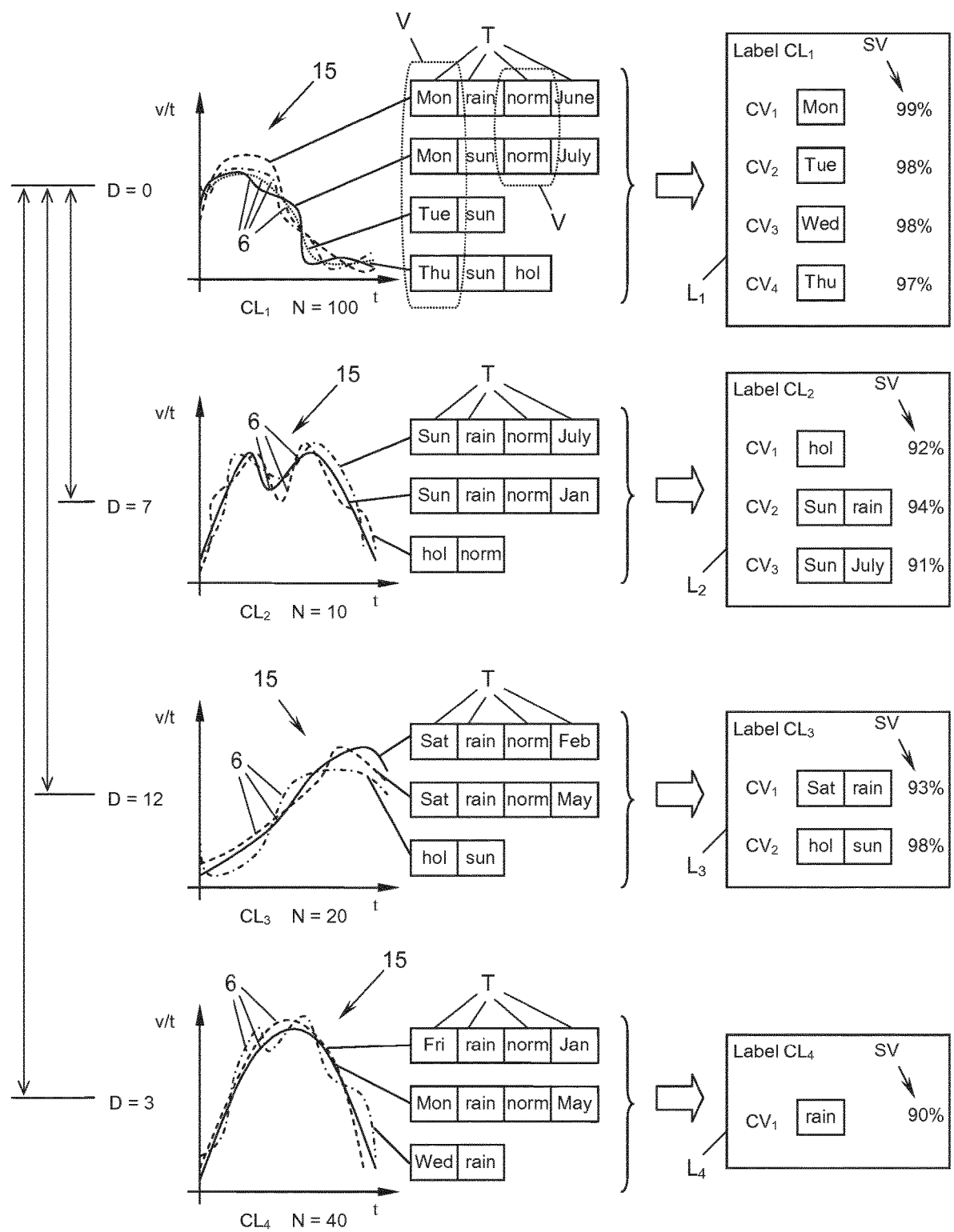
FIG. 3 shows an example of clusters and associated labels occurring at the clustering and labelling stages of the method of the present subject matter.

Coming back to the specific example of FIG. 3, it can be seen that a first traffic profile 6 of the first cluster $CL_1$, has the tags "Monday", "rain", "normal day (no holiday)", and "June". A second traffic profile 6 of this cluster has different tags T, here "Monday", "sunny", "normal day (no holiday)", and "July", and so forth.

To extract a label $L_i$, that most accurately describes a cluster $CL_i$, out of all the tags T of this cluster $CL_i$, the labelling engine 14 firstly calculates a significance value SV for at least some of the tags T within this cluster $CL_i$. In some embodiments, the significance values SV of all tags T of all traffic profiles 6 of a cluster $CL_i$ are calculated, while in other embodiments significance values SV are calculated for only the most common tags T of the traffic profiles 6 of a cluster $CL_i$.

The significance value SV can be calculated by means of a Chi-square statistic. For example, Pearson's Chi Squared statistic can be used if there are 5 or more traffic profiles 6, and an exact combinatorial method like Fisher's exact test can be used if there less than 5 traffic profiles 6. This yields a most accurate description of significance of an individual tag T.

To evaluate if a tag T is in fact significant or not, the labelling engine 14 obtains a threshold value TH from a threshold input 15. The threshold input 15 can be adjusted manually or digitally if it is connected to computer. If the significance value SV of a tag T within a cluster $CL_i$ lies above the threshold TH, a characteristic vector $CV_j$ comprising this tag T is assigned to this cluster $CL_i$, see FIG. 3 on the right.

For the first cluster $CL_1$ of FIG. 3 it can be seen that four tags T within this cluster have a significance value SV lying over the threshold TH value, such that they have been stored as characteristic vectors $CV_1$, $CV_2$, $CV_3$, $CV_4$. The corresponding tags T were "Monday", "Tuesday", "Wednesday", and "Thursday". The label $L_1$ of this cluster $CL_1$ thus consists of four characteristic vectors $CV_j$, each containing a single tag T.

Figure 4:
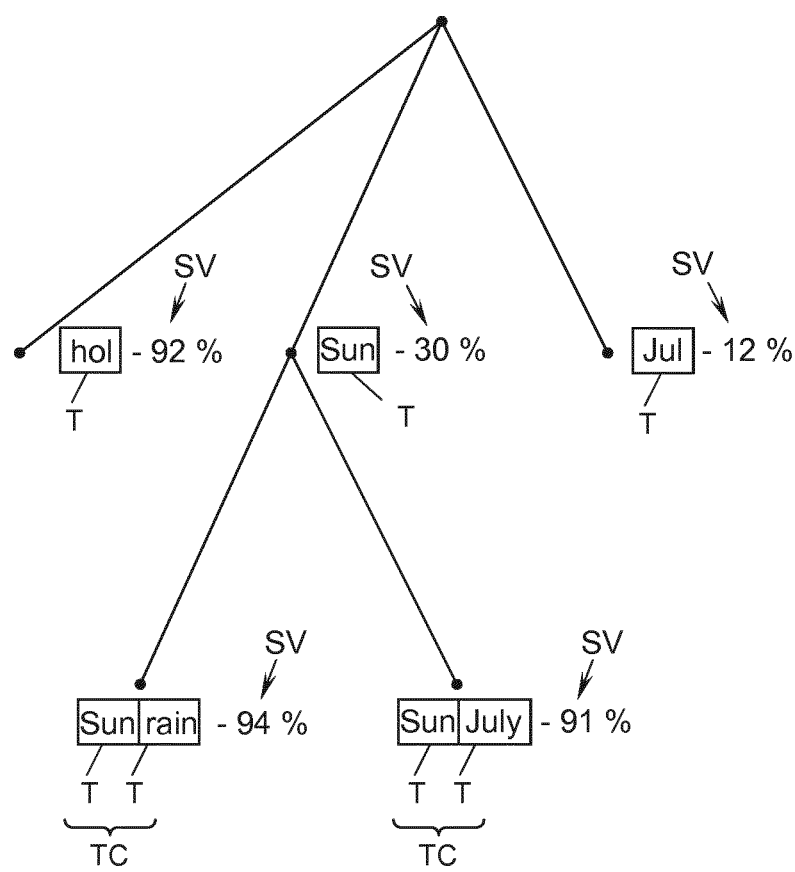
FIG. 4 shows a decision tree used to determine labels for clusters during the method of the present subject matter.

FIG. 4 shows an example of how to generate the label $L_i$ corresponding to the second cluster $CL_2$ and second label $L_2$ of FIG. 3. Here, firstly the significance values SV of three tags "holiday", "Sunday", and "July" have been calculated. Assuming a threshold value TH of 90%, it can be seen that only the tag "holiday" with a significance value SV of 92% qualifies as a characteristic vector $CV_j$.

Additionally, significance values SV for combinations, i.e., "and"-combinations, of tags T can be calculated, either for all tags T whose significance value SV lies below the threshold value TH or for tags T whose significance value SV lies below the threshold value TH but above a further threshold value, for example 25%. For those tags T, the significance value SV is calculated in combination with a further tag T, and if the significance value SV of such a tag combination TC lies above the threshold TH (or a different threshold), this tag combination TC is assigned as a characteristic vector $CV_j$ to this cluster $CL_i$.

Depending on the method to calculate the significance value SV, it might be beneficial to also consider "or"-combinations insofar as they have not been already found in the form of multiple individual tags T whose significance values SV lie above the threshold level within the same cluster $CL_i$. To this end, the significance value SV of an "or"-combination of two tags whose significance value SV lies below the threshold level TH is calculated to see if these are to be included each as a characteristic vector $CV_j$ for a cluster $CL_i$.

Generally, this method can be performed also for tag combinations TC comprising three or more tags T, for example when the significance value SV of a two-tag combination TC again lies in a specific range of thresholds values. By means of this, tag combinations of any length can be assigned to a cluster $CL_i$, as characteristic vectors $CV_j$.

One exemplary algorithm of identifying the significant tags T of a cluster $CL_i$ is given as follows. To begin with, the tags T are specific values of so-called variables V, e.g., variables V can be "weekday", "special day", "school vacation day", "month", "month week", and/or "weather condition". The tags T are in turn assigned to each variable V, e.g., tags "Mon", "Tue", Wed", ... to the variable "weekday", tags "holiday", "pre-holiday", ... to the variable "special day", "Yes", "No" to the variable "school vacation day" and so forth.

In a first step of the exemplary algorithm, it is determined by means of one of said statistical tests (Pearson's Chi Squared test, Fisher's exact test, ... ) if a variable V is significant for a cluster $CL_i$, e.g., if the week day distribution is a priori significant in this cluster $CL_i$.

In a second step, for the most significant variable V the tags T that appear more than expected are determined.

In a third step, the significance value SV for each tag T with respect to the rest of the tags T for that same variable V is determined and compared to a predefined threshold TH as detailed above. In this way it can be determined, e.g., if the "Saturday" distribution is significant with respect to the rest of the week in this cluster. Furthermore, an additional "sub-cluster" $SCL_i$ is generated, which only contains the rest of the traffic profiles 6 that do not correspond to the significant tags T determined before.

In a fourth step, steps two and three are repeated for the sub-cluster $SCL_i$ until there are no more variables V or traffic profiles 6 to analyze.

In a fifth step, the significance test for tags T is performed starting with the least significant variable V according to step one, but only for samples inside this sub-cluster $SCL_i$ and not with the full cluster size. If the significance value SV is above said threshold TH, those tags T will be added to the cluster label.

In a sixth step, the fifth step is repeated for the next sub-cluster $SCL_i$ in increasing significance order. This time, not only its own traffic profiles 6 are considered but also the items of the previously analyzed sub-clusters $SCL_i$ that were not significant. In this way, all "significant" sub-clusters $SCL_i$ for the first level can be computed, and the corresponding tags T are added as a label to the initial cluster $CL_i$.

If there are one or more significant sub-clusters $SCL_i$, in the first level, in a seventh step the process is repeated for each sub-cluster $SCL_i$, in the next level to determine new "child sub-clusters", considering only the characteristics or variables that have not been analyzed before.

These steps are then repeated until there is nothing more to analyze in any branch and all "combined" tags T can be added to the label for the child sub-clusters $SCL_i$.

Furthermore, if a sub-cluster $SCL_i$ includes more than one significant tag T for a variable V, then each tag T will be analyzed in a separate branch. Only if after analyzing all these branches they do not have sub-branches, all the tags T are grouped together.

Also, to calculate the significance value SV of a tag T in each branch, only the traffic profiles 6 corresponding to the variables of all levels above the analyzed branch are considered. For example, when the tag "rainy" of a sub-cluster "Fridays" is analyzed, the expected value for "rainy" will be calculated considering only the weather conditions for all the "Fridays" of the total population.

Returning to the second cluster $CL_2$ of FIG. 3 detailed in FIG. 4, it can be seen that the tag combinations "Sunday and rain" and "Sunday and July" have significance values SV lying above the threshold value TH. Thus, those two tag combinations TC are assigned as characteristic vectors $CV_1$, $CV_2$ to the second cluster $CL_2$.

In this example, it can be seen that while the second cluster $CL_2$ is not representative for Sundays, rainy days, or days in July alone, this cluster $CL_2$ is representative for rainy Sundays and Sundays in July.

Furthermore, if two clusters are assigned the same characteristic vectors $CV_j$, the characteristic vector $CV_j$, whose tag T or tag combination TC has the lower significance value SV can be deleted from the label $L_i$, of this cluster $CL_i$.

By means of this, all clusters $CL_i$ can be assigned a label $L_i$ comprising any number of characteristic vectors $CV_j$ that represent this cluster $CL_i$. The labelling engine 14 in turn stores these labelled clusters $CL_i$ in a database 16 which can again be embodied as the database 7 or a subset thereof, as the database 12 or a subset thereof, or embodied as a stand-alone database.

From the first cluster $CL_1$ of FIG. 3 it can also be seen that since the characteristic vectors $CV_1$, $CV_2$, $CV_3$, $CV_4$ each comprise a single tag T only, they can optionally be grouped together, for example as weekdays. This can be done to reduce the number of characteristic vectors $CV_j$, which in turn reduces computational efforts when trying to find a certain cluster.

The labelled clusters $CL_i$ in the database 16 can now be used to predict a past, present, or future traffic behaviour PTB (FIG. 2) in the road system 1. To this end, a request Req can be fed into a prediction engine 17, which for this purpose obtains the labelled clusters $CL_i$ from the database 16. The request Req comprises one or more request tags RT, which can be formulated by a user. The prediction engine 17 then matches the request tags RT to the characteristic vectors $CV_j$, of the labelled clusters $CL_i$ to determine a "matching" cluster $CL_i$. This matching cluster $CL_i$, or any data derived therefrom, is then output by the prediction engine 17 as the predicted traffic behaviour PTB.

One exemplary setup of the engines 11, 14, 17 can be as follows: While the traffic measuring device 4 acquires data in real-time in the field, after an extended period of, e.g., one year, the clustering engine 11 and the labelling engine 14 can produce the labelled clusters $CL_i$ in the processor 9 of a central station. On the other hand, the prediction engine 17 can be embodied as an entity physically distinct from the clustering and labelling engines 11, 14. Alternatively, the clustering engine 11, labelling engine 14, and prediction engine 17 can be implemented by the same machine.

Figure 5:
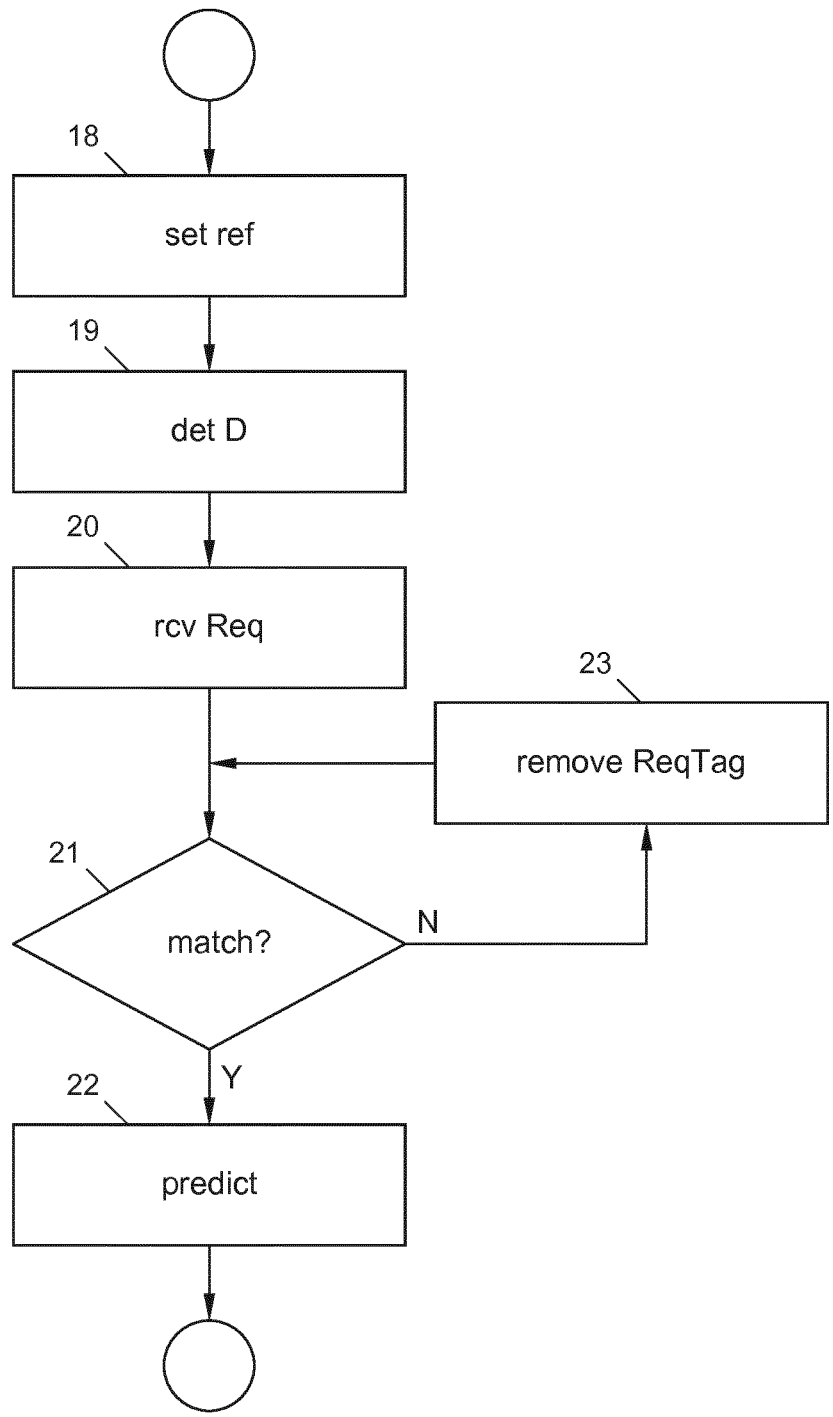
FIG. 5 shows a flow chart of the prediction stage of the method of the present subject matter.
Figure 6:
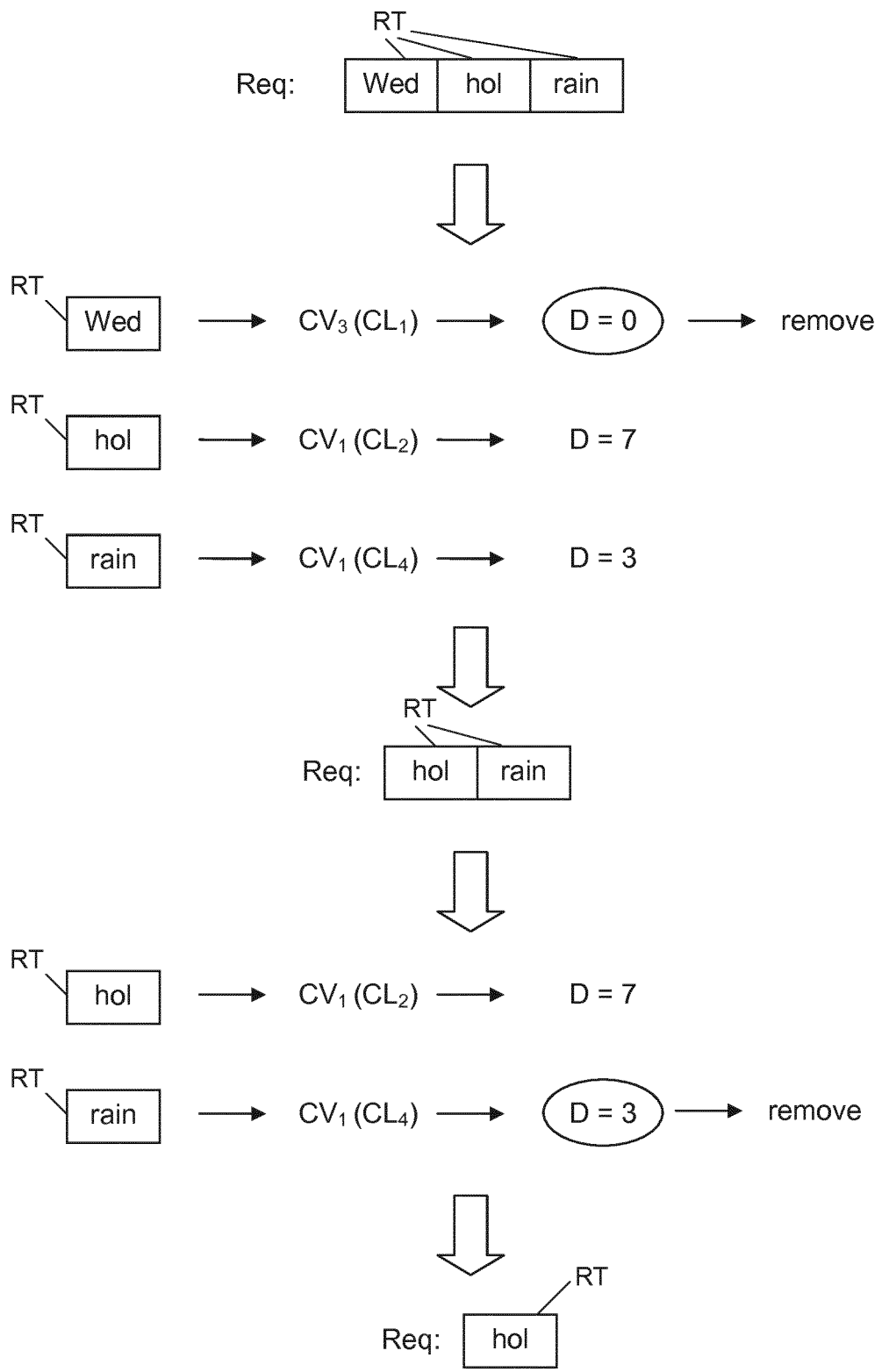
FIG. 6 shows an example of the elimination of tags from the request during the prediction stage of FIG. 5.

The operation of the prediction engine 17 is now described in further detail by means of FIGS. 5 and 6. After starting the prediction process, in step 18 the cluster $CL_i$ that comprises the highest number N of traffic profiles 6 is determined and set as a reference cluster. In the example of FIG. 3, the first cluster $CL_1$ contains the most (N=100) traffic profiles 6.

In step 19, a dissimilarity measure D is calculated for each of the clusters $CL_i$. The dissimilarity measure D is a measure of how much the traffic profiles 6 of a specific cluster $CL_i$ differ from the traffic profiles 6 of the reference cluster (here: $CL_1$). Once a dissimilarity measure D is calculated for a cluster $CL_i$, it can be assigned to all characteristic vectors $CV_j$ of this cluster $CL_i$. Per definition, the reference cluster does not differ from itself and thus has the lowest dissimilarity measure, e.g., D=0, assigned.

To compute a dissimilarity measure D for the other clusters, for example, an averaged traffic profile of a cluster $CL_i$ is compared to an averaged traffic profile of the reference cluster. In some embodiments, this can be done by using the same distance metric that was used to generate the clusters. In the example of FIG. 3, the third cluster $CL_3$ deviates the most from the reference cluster $CL_1$ and has a dissimilarity measure D=12 assigned thereto. The fourth cluster $CL_4$ only deviates a little bit from the reference cluster and has a dissimilarity measure D=3 assigned, while the second cluster $CL_2$ has a dissimilarity measure D=7 assigned. It is stressed that the dissimilarity measure D is independent from the number N of traffic profiles 6 in a cluster $CL_i$ and only represents a difference of the average, modal, or median value, or there like, of traffic profiles 6 between clusters $CL_i$. Any measure of (dis)similarity between curves known in the state of the art can be used as the dissimilarity measure D such as, for example, an L2 norm, an L1 norm, or hybrid norms. Steps 19 and 20 can, e.g., be performed in the processor 9 or in the labelling engine 14.

After a request Req with request tags RT is fed into the prediction machine 17 in step 20, it is checked in step 21 whether all request tags RT of the request Req match one of the characteristic vectors $CV_j$ of the clusters $CL_i$. For this purpose, the request tags RT can be combined to the form of a characteristic vector $CV_j$ to see if any of the characteristic vectors $CV_j$ of the clusters coincide with it. If this is the case (branch "Y"), the cluster $CL_i$ that contains the matching characteristic vector $CV_j$ is determined as the matching cluster $CL_i$ in step 22.

At the end of step 22, either the whole matching cluster $CL_i$ or an average traffic profile or any other data derived from this matching cluster $CL_i$ can be output by the prediction engine 17 as the predicted traffic behaviour PTB for the request Req. Alternatively, if in step 21 no matching characteristic vector $CV_j$ can be found amongst the clusters $CL_i$ (branch "N"), one of the request tags RT is eliminated from the request Req in a step 23, and step 21 is repeated.

The step 23 of removing a request tag RT from the request Req is described in detail by means of an example shown in FIG. 6, which again uses the exemplary clusters of FIG. 3. Here, in the beginning the request Req comprises the request tags "Wednesday", "holiday", and "rain". When the step 21 is performed for the first time, it is checked whether the combination of these three request tags RT appears in any of the labels $L_i$ of the four clusters $CL_i$, see the four labels $L_1$, $L_2$, $L_3$, $L_4$ on the right side of FIG. 3. In this example, no characteristic vector $CV_j$ can be found that comprises the three request tags RT.

To eliminate one of the request tags RT from the request Req, in one embodiment of the present method for each request tag RT it is checked individually whether there exists a characteristic vector $CV_j$ matching this request tag RT, i.e., it is not checked whether this request tag RT simply occurs in a tag combination TC of a characteristic vector $CV_j$, but only if there is a characteristic vector $CV_j$ that exactly matches the request tag RT. By means of FIGS. 3 and 6, it can be seen that the request tag "Wednesday" of the request Req occurs as the characteristic vector $CV_3$ in the label $L_1$ of the first cluster $CL_1$, the request tag "holiday" of the request Req occurs as the characteristic vector $CV_1$ in the label $L_2$ of the second cluster $CL_2$, and the request tag "rain" of the request Req occurs as the characteristic vector $CV_1$ in the label $L_4$ of the fourth cluster $CL_4$.

Now it is checked which of these corresponding characteristic vectors $CV_j$ has the lowest dissimilarity measure D. Since the characteristic vector $CV_3$ is in the first cluster $CL_1$, which has the lowest dissimilarity measure D=0, and the other two clusters $CL_2$, $CL_4$ have higher dissimilarity measures D=7, 3, respectively, the request tag "Wednesday" is eliminated from the request Req because this request tag RT corresponds to a characteristic vector $CV_j$ of the cluster $CL_i$ with the lowest dissimilarity measure D, i.e., to the least interesting cluster $CL_i$, here: cluster $CL_1$.

Thereafter, step 21 is repeated and it is checked whether there exists a characteristic vector $CV_j$ that contains the tag combination of the remaining two request tags "holiday" and "rain". Again, this is not the case, and therefore it is again checked which of the two remaining request tags RT corresponds to a cluster $CL_i$ with the lowest dissimilarity measure D. In this case, the request tag "rain" is eliminated from the request Req because it has the lower dissimilarity measure D.

Thereafter, it is again checked whether the request Req, which now only comprises the tag "holiday", matches any of the characteristic vectors $CV_j$ of the clusters $CL_i$. This is the case for the second cluster $CL_2$, which has the characteristic vector $CV_1$ assigned. Therefore, the second cluster $CL_2$ is the matching cluster, from which the predicted traffic behaviour PTB is then derived.

Sometimes request tags RT do not occur in a characteristic vector $CV_j$ that contains only this request tag RT in any of the clusters $CL_i$ because either this tag of the request is not present in any of the tags T of the traffic profiles 6 that are used to create the clusters $CL_i$ or because this tag T is only used in a characteristic vector $CV_j$ in a combination with a further tag T. In this case, the lowest dissimilarity measure, e.g., D=0, can be assigned to this request tag RT.

In an alternative embodiment, when checking which of the request tags RT is to be eliminated, it is not only checked if there is a characteristic vector $CV_j$ that only comprises this request tag RT, but it is also checked whether there is a characteristic vector $CV_j$ comprising this request tag RT in combination with a further tag T. In this case, this characteristic vector $CV_j$ and in turn the underlying cluster $CL_i$ and its dissimilarity measure D is chosen, for which, e.g., the significance value SV of the characteristic vector $CV_j$ is higher or which has a higher or lower number N of traffic profiles 6. For example, in FIG. 3 for the tag "holiday", the characteristic vector $CV_1$ of the second cluster $CL_2$ and the characteristic vector $CV_2$ of the third cluster $CL_3$, which has the tag combination "holiday and sunny", are available. Because the significance value SV of the characteristic vector $CV_2$ of the tag combination "holiday and Sunday" the third cluster $CL_3$ is higher (98%) than the significance value SV (92%) of the characteristic vector $CV_1$ in the second cluster $CL_2$, the dissimilarity measure D=12 of the third cluster $CL_3$ (and not D=7 of the second cluster $CL_2$) is chosen for the request tag "holiday" and further used in the comparison steps of FIG. 6. Thus, in some embodiments, in which significance values SV of characteristic vectors $CV_j$ have been used to label the clusters $CL_i$ these significance values SV can also be used when determining the cluster $CL_i$ matching the request Req.

In all embodiments, when checking which request tag RT corresponds to the characteristic vector $CV_j$ of a cluster $CL_i$, and two clusters have the same characteristic vectors $CV_j$, the characteristic vector $CV_j$ with the higher significance value SV can be chosen for this request tag RT.

Furthermore, when in the matching step 21 two matching clusters $CL_i$ are found, the one with the high number N of traffic profiles 6 can be determined as the matching cluster and the other one discarded.

To further enhance the accuracy of the method, not only can there be checked whether single request tags RT occur in the characteristic vectors $CV_j$ of the clusters $CL_i$, but also if combinations of request tags RT correspond to a characteristic vector $CV_j$ of a cluster $CL_i$. In this case, if this characteristic vector $CV_j$ corresponding to a combination of request tags RT has the lowest dissimilarity measure D amongst the characteristic vectors $CV_j$ corresponding to all request tags RT or request tag combinations, said request tag combination is disregarded until a request tag RT is eliminated from the request Req.

CONCLUSION

The present subject matter is not restricted to the specific embodiments described in detail herein, but encompasses all variants, combinations and modifications thereof that fall within the framework of the appended claims.

What is claimed is:
1. A method in a road system, comprising:
in a traffic measuring device:
measuring traffic conditions on a road or intersection of roads in the form of a set of traffic profiles, each traffic profile representing a traffic measure of vehicles in the road system recorded over time as a sampled or smooth curve, one or more pre-defined tags associated with a time of recording of the respective traffic profile being attributed to said traffic profile;
in a clustering engine of at least one processor connected to a database, which contains said set of traffic profiles:
clustering the traffic profiles with their tags into at least one cluster-based on similarity by using computed distance metrics between the curves of the traffic profiles, each cluster comprising multiple traffic profiles that are similar to each other in their curves;
in a labelling engine:
calculating a significance value for at least one tag in each cluster-by means of a statistical analysis of the at least one tag, wherein the significance value of each at least one tag is calculated by means of a Chi-squared statistic, and
if the significance value of a tag is higher than a threshold value, assigning the tag as a characteristic vector to a cluster in which the tag is clustered;
in a prediction engine:
receiving a request having one or more request tags,
determining a matching cluster by means of matching the one or more request tags to respective characteristic vectors of one or more clusters, and
outputting a predicted traffic behaviour based on the determined matching cluster; and
choosing at least one of a different route or a travel time for a vehicle based on the predicted traffic behaviour.

2. The method according to claim 1, wherein each tag is assigned a value of a plurality of specific values of a variable, the method comprising the further steps of
calculating a significance value for at least one variable in each cluster; and
calculating a significance value for at least one tag assigned to the variable with the highest significance value of each cluster.

3. The method according to claim 2, wherein the method comprises the further steps of
grouping all traffic profiles that do not contain a tag whose significance value lies above said threshold value to a sub-cluster;
calculating a significance value for at least one variable in the sub-cluster; and
calculating a significance value for a tag assigned to the variable with the highest significance value of the sub-cluster.

4. The method according to claim 3, wherein the steps of grouping, calculating the significance value for the at least one variable in the sub-cluster and calculating the significance value for the tag assigned to the variable are repeated until no more traffic profiles are available for grouping.

5. The method according to claim 3, wherein, for at least one tag whose significance value lies below said threshold, a significance value of a combination of said tag with a further tag is calculated and, if said significance value of said tag combination lies above the threshold, assigning said tag combination as a further characteristic vector to the cluster of said tag.

6. The method according to claim 3, wherein, when two clusters would be assigned the same vector, the threshold value is lowered and it is again checked if the significance value of each at least one tag, respectively, is higher than the threshold value to assign at least one tag as the characteristic vector to this a respective cluster.

7. The method according to claim 2, wherein, for at least one tag whose significance value lies below said threshold, a significance value of a combination of said tag with a further tag is calculated and, if said significance value of said tag combination lies above the threshold, assigning said tag combination as a further characteristic vector to the cluster of said tag.

8. The method according to claim 2, wherein for each cluster significance values for all tags of this cluster are calculated.

9. The method according to claim 2, wherein, when two clusters would be assigned the same characteristic vector, the threshold value is lowered and it is again checked if the significance value of each at least one tag is higher than the threshold value to assign the at least one tag as the characteristic vector to a respective cluster.

10. The method according to claim 2, wherein the significance values of the tags are used when checking whether a request tag matches a characteristic vector.

11. The method according to claim 2, wherein each traffic profile represents the traffic measures of vehicles in the road system over a time-span of 24 hours.

12. The method according to claim 2, wherein at least one tag indicates a day of the week, a month of the year, a week of the month, a school vacation indication, or a special holiday indication of said time of recording.

13. The method according to claim 2, wherein at least one tag indicates a road condition or a weather condition at said time of recording.

14. The method according to claim 1, wherein, for at least one tag whose significance value lies below said threshold, a significance value of a combination of said tag with a further tag is calculated and, if said significance value of said tag combination lies above the threshold, assigning said tag combination as a further characteristic vector to the cluster of said tag.

15. The method according to claim 1, wherein for each cluster significance values for all tags of this cluster are calculated.

16. The method according claim 1, wherein, when two clusters would be assigned the same characteristic vector, the threshold value is lowered and it is again checked if the significance value of each at least one tag is higher than the threshold value to assign the at least one tag as the characteristic vector to a respective cluster.

17. The method according to claim 1, wherein the significance values of the tags are used when checking whether a request tag matches a characteristic vector.

18. The method according to claim 1, wherein each traffic profile represents the traffic measure of vehicles in the road system over a time-span of 24 hours.

19. The method according to claim 1, wherein at least one tag indicates a day of the week, a month of the year, a week of the month, a school vacation indication, or a special holiday indication of said time of recording.

20. The method according to claim 1, wherein at least one tag indicates a road condition or a weather condition at said time of recording.

* * * * *